US008693438B2

(12) United States Patent
Takahashi et al.

(10) Patent No.: US 8,693,438 B2
(45) Date of Patent: Apr. 8, 2014

(54) MOBILE COMMUNICATION METHOD AND RADIO BASE STATION (75) Inventors: Hideaki Takahashi, Tokyo (JP); Wuri Andarmawanti Hapsari, Tokyo (JP); Takeshi Okamoto, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 105 days.

(21) Appl. No.: 13/505,515

(22) PCT Filed: Nov. 2, 2010

(86) PCT No.: PCT/JP2010/069489
§ 371 (c)(1),
(2), (4) Date: Jun. 26, 2012

(87) PCT Pub. No.: WO2011/052780
PCT Pub. Date: May 5, 2011

(65) Prior Publication Data
US 2012/0257602 A1    Oct. 11, 2012

(30) Foreign Application Priority Data

Nov. 2, 2009   (JP) ................................. 2009-252255

(51) Int. Cl.
*H04W 4/00*   (2009.01)
*H04W 36/00*  (2009.01)

(52) U.S. Cl.
USPC ........................................................ 370/331

(58) Field of Classification Search
None
See application file for complete search history.

(56) References Cited

U.S. PATENT DOCUMENTS

2011/0237258 A1*  9/2011  Nylander et al. ............. 455/437
2011/0243097 A1*  10/2011  Lindqvist et al. ............. 370/331
2011/0281584 A1*  11/2011  Sander et al. ................. 455/436
2012/0106488 A1*  5/2012  Nylander et al. ............. 370/329

OTHER PUBLICATIONS

Catt, "Reporting of Access Mode," 3GPP TSG RAN WG2 Meeting #67, R2-094311, Shenzhen, China, Aug. 24-28, 2009, 2 pages.
3GPP TS 36.300 V9.1.0, Sep. 2009, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," pp. 21-23, 5 pages.
Panasonic, "Support for inbound CSG mobility," 3GPP TSG RAN WG2 #65bis, R2-092388, Seoul, Korea, Mar. 23-27, 2009, 3 pages.
3GPP TS 36.300 V9.5.0, Sep. 2010, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 172 pages.
3GPP TR R3.020 V0.9.0, Sep. 2008, "3rd Generation Partnership Project; Technical Specification Group Radio Access Network; Home (e)NodeB; Network aspects (Release 8)," 67 pages.

(Continued)

*Primary Examiner* — Chirag Shah
*Assistant Examiner* — Ashley Shivers
(74) *Attorney, Agent, or Firm* — Osha Liang LLP (57) ABSTRACT Even when radio base stations including radio base station identification information eNB IDs having different lengths are coexistent, it is possible to perform an S1 handover. A mobile communication method according to the present invention includes a step of determining, a handover source radio base station eNB#0, whether a handover destination candidate radio base station is a macro cell radio base station eNB or a small cell radio base station HeNB with reference to a predetermined bit set in Cell ID included in E-CGI included in Measurement Report received from a mobile station UE.

3 Claims, 8 Drawing Sheets (56) References Cited

OTHER PUBLICATIONS

3GPP TS 36.413 V9.4.0, Sep. 2010, "3rd Generation Partnership Project; Technical Specification Group Radio Access Network; Evolved Universal Terrestrial Radio Access Network (E-UTRAN); S1 Application Protocol (S1AP) (Release 9)," 241 pages.

3GPP TS 36.413 V9.0.0, Sep. 2009, "3rd Generation Partnership Project; Technical Specification Group Radio Access Network; Evolved Universal Terrestrial Radio Access Network (E-UTRAN); S1 Application Protocol (S1AP) (Release 9)," 227 pages.

International Search Report issued in PCT/JP2010/069489, mailed on Jan. 11, 2011, with translation, 2 pages.

Notice of Grounds for Rejection for Japanese Patent Application No. 2009-252255 mailed Jul. 3, 3012, with English translation thereof (5 pages).

* cited by examiner

E-CGI CONFIGURATION

TARGET ID

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| CHOICE TARGET ID | | | | | | |
| >TARGET eNB-ID | | | | | | |
| >>GLOBAL eNB-ID | M | | 9.2.1.37 | | | |
| >>SELECTED TAI | M | | TAI 9.2.3.16 | | | |

GLOBAL eNB ID

| IE/GROUP NAME | PRESENCE | RANGE | IE TYPE AND REFERENCE | SEMANTICS DESCRIPTION |
|---|---|---|---|---|
| PLMN IDENTITY | M | | 9.2.3.8 | |
| CHOICE eNB ID | M | | | |
| >Macro eNB ID | | | BIT STRING (28) | EQUAL TO THE 20 LEFTMOST BITS OF THE CELL IDENTITY IE CONTAINED IN THE E-UTRAN CGI/IE (SEE SECTION 9.2.1.38) OF EACH CELL SERVED BY THE eNB |
| >Home eNB ID | | | BIT STRING (28) | EQUAL TO THE CELL IDENTITY IE CONTAINED IN THE E-UTRAN CGI/IE (SEE SECTION 9.2.1.38) OF THE CELL SERVED BY THE eNB |

E-UTRAN CELL GLOBAL ID (E-CGI)

| IE/GROUP NAME | PRESENCE | RANGE | IE TYPE AND REFERENCE | SEMANTICS DESCRIPTION |
|---|---|---|---|---|
| PLMN IDENTITY | M | | 9.2.3.8 | |
| CELL IDENTITY | M | | BIT STRING (28) | THE LEFTMOST BITS OF THE CELL IDENTITY CORRESPOND TO THE eNB ID (DEFINED IN SECTION 9.2.1.37) |

MOBILE COMMUNICATION METHOD AND RADIO BASE STATION

TECHNICAL FIELD

The present invention relates to a mobile communication method and a radio base station.

BACKGROUND ART

In an LTE (Long Term Evolution) mobile communication system, it is necessary for a handover source radio base station to designate Target ID for identifying a handover destination candidate radio base station eNB/HeNB in an HO Required message to be transmitted to a mobile switching center MME (Mobility Management Entity).

Figure 8:
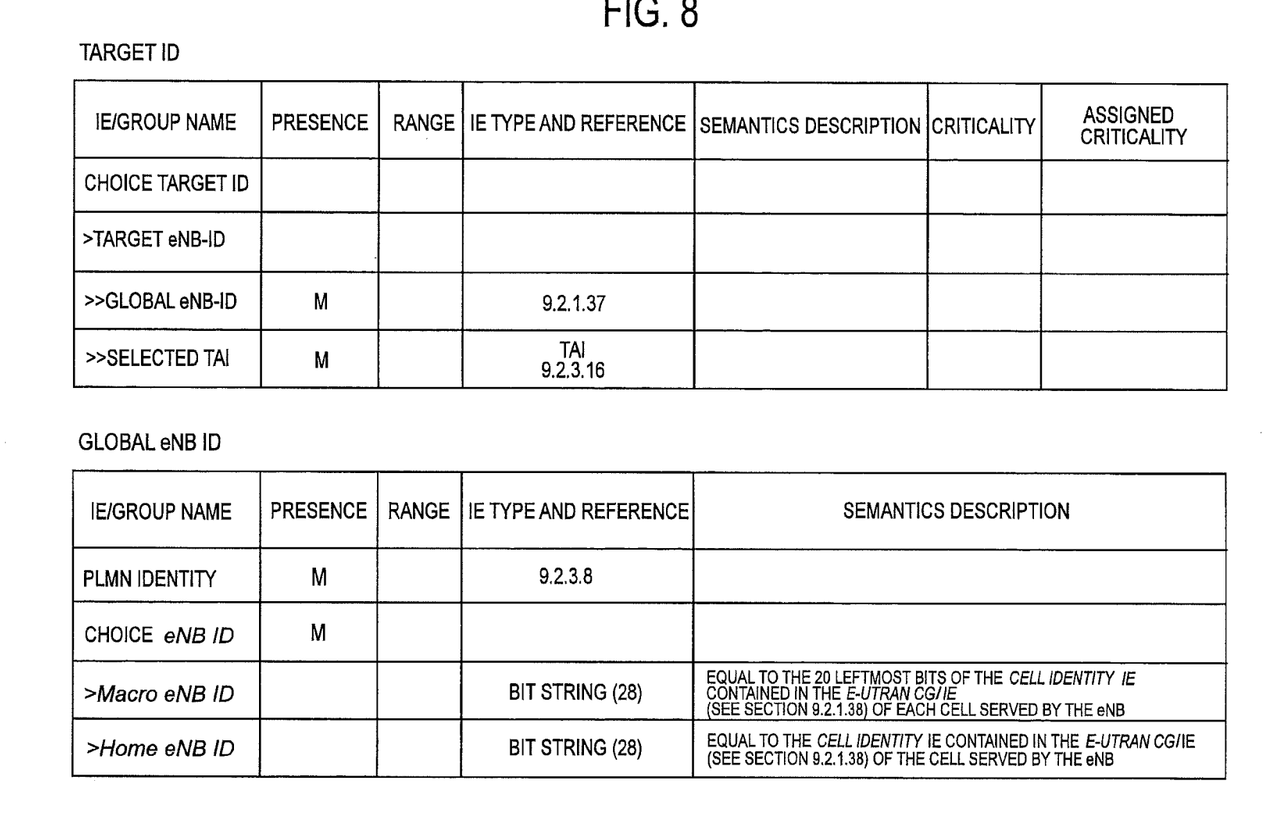
FIG. 8 is a diagram explaining an information element "Target ID" included in an "HO Required" message transmitted in an LTE mobile communication system and an information element "Global eNB ID" included in the information element "Target ID".

As illustrated in FIG. 8, an information element "Target ID" included in HO Required in an Intra-LTE handover includes an information element "Global eNB ID" and an information element "Selected TAI".

Furthermore, as illustrated in FIG. 8, one of Macro eNB ID (identification information of a radio base station eNB) of 20 bit length and Home eNB ID (identification information of a radio base station HeNB) of 28 bit length is set in an information element "eNB ID" included in the information element "Global eNB ID".

Figure 9:
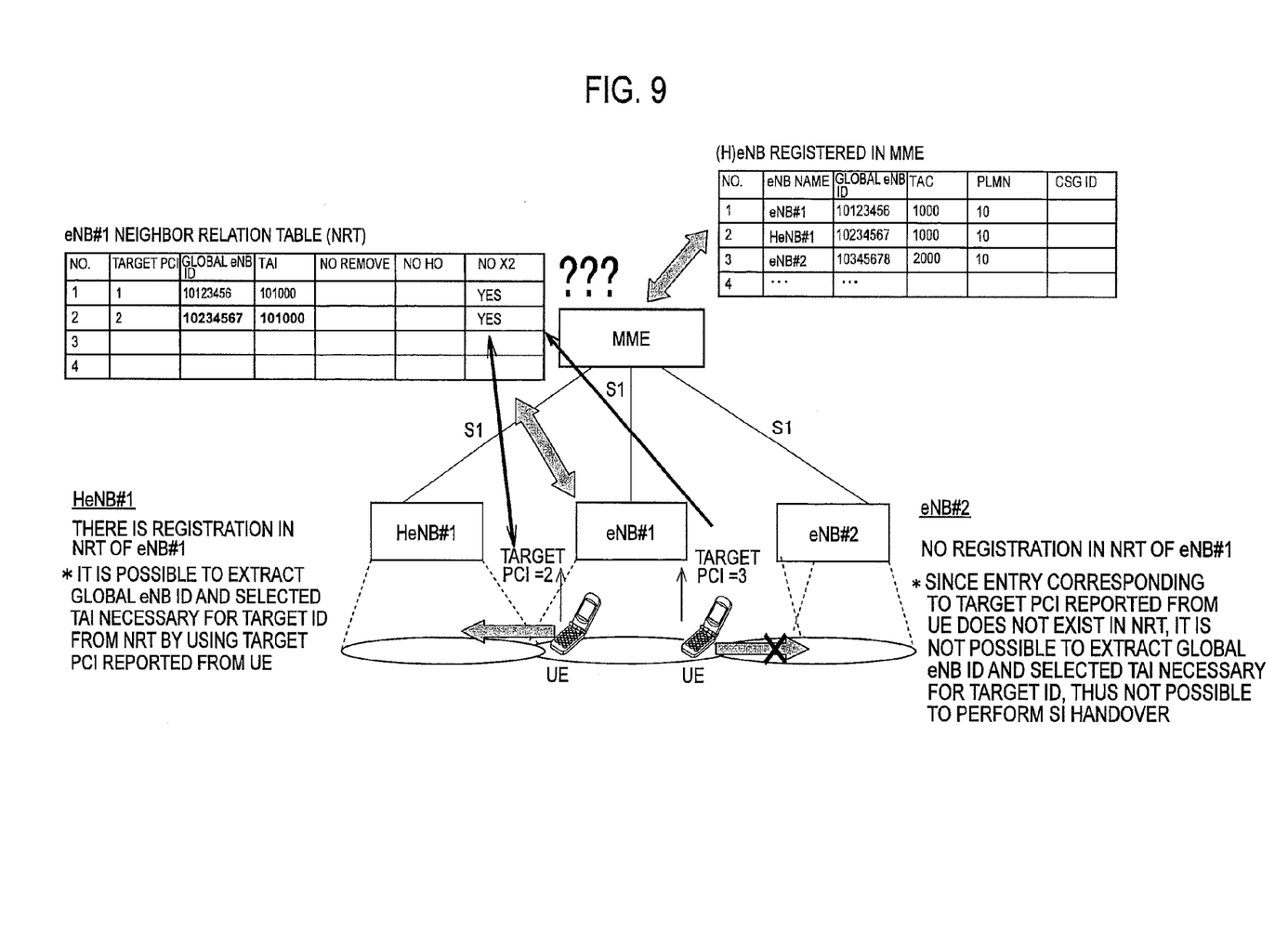
FIG. 9 is a diagram explaining a problem in an S1 handover performed in an LTE-Rel.8 mobile communication system.

Furthermore, in an LTE-Rel.8 mobile communication system, as illustrated in FIG. 9, since a mobile station UE is configured to transmit Measurement Report which includes only PCI (Physical Cell ID) (Target PCI) of a handover destination candidate cell, that is, does not include identification information (Global eNB ID) of the handover destination candidate radio base station or identification information (TAI: Tracking Area ID) of a handover destination candidate tracking area, it is necessary for a handover source radio base station eNB#1 to extract the identification information (Global eNB ID) of the handover destination candidate radio base station or the identification information (TAI) of the handover destination candidate tracking area based on the PCI with reference to NRT (Neighbor Relation Table).

Therefore, it is not possible for the mobile station UE to perform an S1 handover with respect to a radio base station eNB/HeNB (a radio base station eNB#2 in the example of FIG. 9) not registered in the NRT of the handover source radio base station eNB#1.

Meanwhile, in an LTE-Rel.9 mobile communication system, since it is possible for a mobile station UE to transmit Measurement Report including E-CGI (E-UTRAN Cell Global Identity) and TAI related to a handover destination candidate cell, it is possible for a handover source radio base station S-eNB to acquire Global eNB ID and TAI which constitute Target ID for identifying a handover destination candidate radio base station not registered in the NRT.

Figure 10:
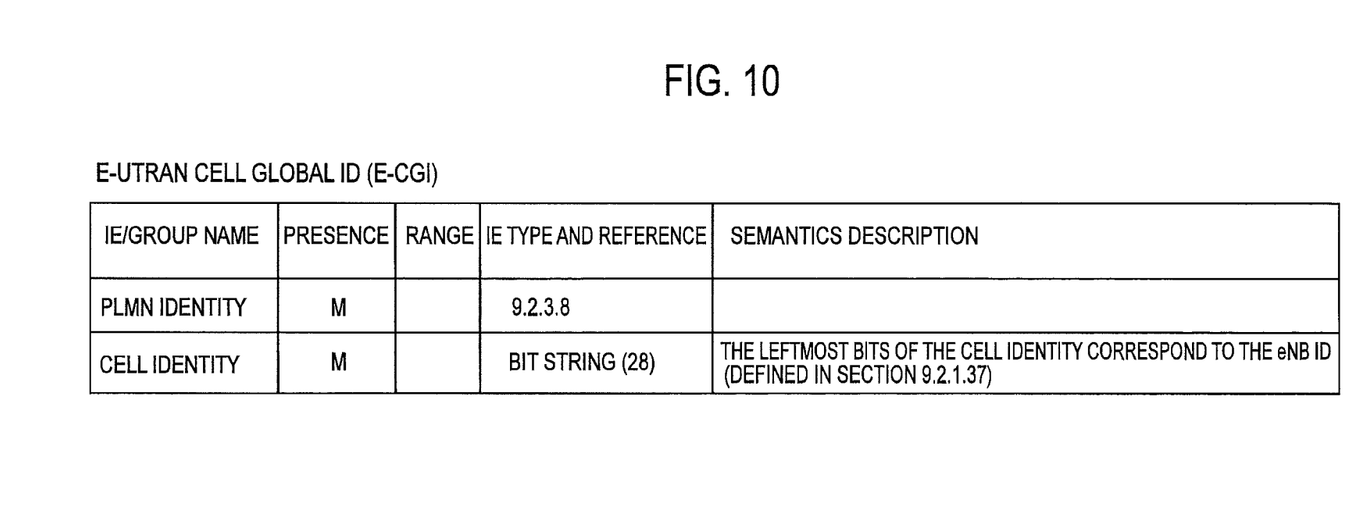
FIG. 10 is a diagram explaining an information element "E-CGI" included in a "Measurement Report" message transmitted in an LTE-Rel.9 mobile communication system.

FIG. 10 illustrates an example of an information element included in the information element "E-CGI" included in the Measurement Report.

Therefore, it is possible for the handover source radio base station to also transmit the HO Required message including the Target ID to the handover destination candidate radio base station eNB/HeNB not registered in the NRT or the handover destination candidate radio base station HeNB subordinate to a gateway device HeNB-GW, but it is not possible to determine whether the handover destination candidate radio base station included in the Measurement Report transmitted by the mobile station UE is the radio base station eNB or the radio base station HeNB.

That is, the E-CGI included in the Measurement Report transmitted by the mobile station UE does not include information for determining the type (eNB/HeNB) of the handover destination candidate radio base station.

In addition, when a lower 28 bit of the E-CGI includes Cell ID (corresponds to Cell Identity set in the information element "Cell Identity" illustrated in FIG. 10) and the handover destination candidate radio base station is the radio base station HeNB, the Cell ID includes Home eNB ID. When the handover destination candidate radio base station is the radio base station eNB, the Cell ID includes Macro eNB ID of 20 bit length and 8-bit identification information of a cell subordinate to the radio base station HeNB.

Furthermore, the mobile switching center MME searches for whether an entry coinciding with the Global eNB ID set in the information element "Global eNB ID" in the HO Required message received from the handover source radio base station is registered.

Here, when the entry has not been registered and the length of the information element "eNB ID" in the information element "Global eNB ID" is 20 bits, the mobile switching center MME transmits HO Failure to the handover source radio base station.

Meanwhile, when the entry has not been registered and the length of the information element "eNB ID" in the information element "Global eNB ID" is 28 bits, the mobile switching center MME searches for whether a gateway device HeNB-GW having TAI coinciding with the TAI set in the information element "Selected TAI" in the HO Required received from the handover source radio base station is registered.

When the gateway device HeNB-GW is registered, the mobile switching center MME transmits HO Request including the TAI to the gateway device HeNB-GW. When the gateway device HeNB-GW has not been registered, the mobile switching center MME transmits HO Failure to the handover source radio base station.

However, in the above-mentioned mobile communication system, when the S1 handover is performed, since it is not possible for the handover source radio base station to determine the type (eNB/HeNB) of the handover destination candidate radio base station based on the E-CGI included in the Measurement Report transmitted by the mobile station UE, there is a problem that it is not possible to decide the length (20 bits or 28 bits) of the information element "Global eNB ID" in the information element "Target ID" in the HO Required.

SUMMARY OF THE INVENTION

Therefore, the present invention has been achieved in view of the above-described problems, and an object thereof is to provide a mobile communication method and a radio base station, by which it is possible to perform an S1 handover even when radio base stations including radio base station identification information eNB IDs having different lengths are coexistent.

A first characteristic of the present embodiment is summarized in that a mobile communication method, which performs a handover process of a mobile station from a cell subordinate to a first radio base station to a cell subordinate to a second radio base station, comprising, a step of determining, by the first radio base station, whether the second radio base station is a macro cell radio base station or a small cell radio base station with reference to predetermined information set in cell identification information capable of designating the cell subordinate to the second radio base station, which is included in a measurement report received from the mobile station, a step of transmitting, by the first radio base station, a first handover request signal, in which a part of the cell identification information is set as identification information of the second radio base station, to a mobile switching center when it is determined that the second radio base station is the macro cell radio base station, and a step of transmitting, by the first radio base station, a first handover request signal, in which the cell identification information is set, as is, as the identification information of the second radio base station, to the mobile switching center when it is determined that the second radio base station is the small cell radio base station.

A second characteristic of the present embodiment is summarized in that a radio base station, which serves as a first radio base station in a handover process of a mobile station from a cell subordinate to the first radio base station to a cell subordinate to a second radio base station, comprising, a determination unit configured to determine whether the second radio base station is a macro cell radio base station or a small cell radio base station with reference to predetermined information set in cell identification information capable of designating the cell subordinate to the second radio base station, which is included in a measurement report received from the mobile station, and a transmission unit configured to transmit a handover request signal, in which identification information of the second radio base station is set, to a mobile switching center, in which when the determination unit has determined that the second radio base station is the macro cell radio base station, the transmission unit is configured to transmit a handover request signal, in which a part of the cell identification information is set as the identification information of the second radio base station, to the mobile switching center, and when the determination unit has determined that the second radio base station is the small cell radio base station, the transmission unit is configured to transmit a handover request signal, in which the cell identification information is set, as is, as the identification information of the second radio base station, to the mobile switching center.

DETAILED DESCRIPTION

Configuration of Mobile Communication System According to First Embodiment of the Present Invention With reference to FIG. 1 to FIG. 4, the configuration of a mobile communication system according to a first embodiment of the present invention will be described.

Figure 1:
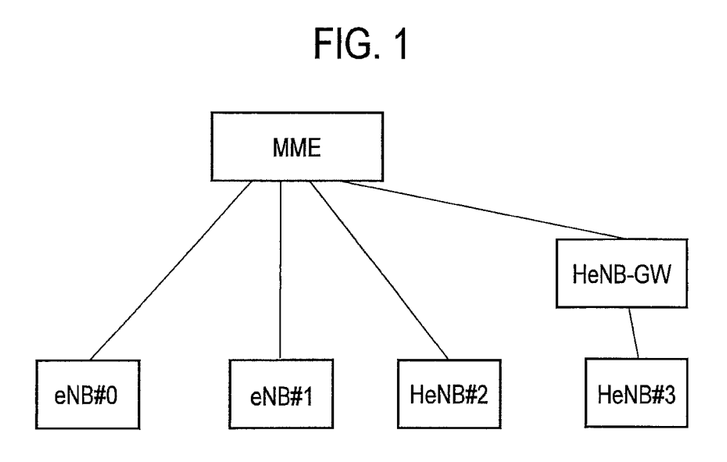
FIG. 1 is a diagram showing the entire configuration of a mobile communication system according to a first embodiment of the present invention.

The mobile communication system according to the present embodiment is an LTE mobile communication system, and as illustrated in FIG. 1, includes a mobile switching center MME, a gateway device HeNB-GW, and radio base stations eNB#0, eNB#1, HeNB#2, and HeNB#3. The radio base station HeNB#3 is subordinate to the gateway device HeNB-GW.

Here, the radio base stations eNB#0 and eNB#1 are macro cell radio base stations for managing a macro cell, and the radio base stations HeNB#2 and HeNB#3 are small cell radio base stations for managing a small cell including a CSG cell.

Figure 2:
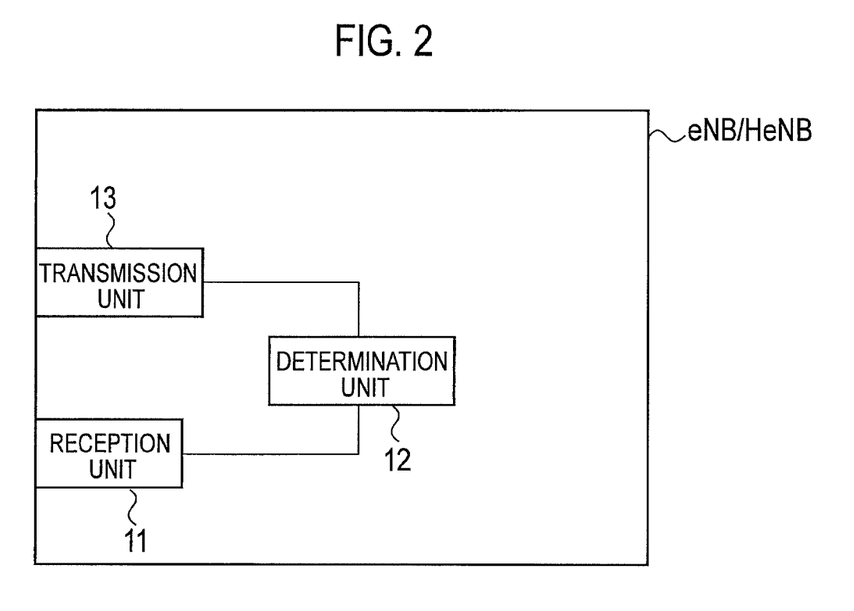
FIG. 2 is a functional block diagram of a radio base station eNB/HeNB according to the first embodiment of the present invention.

As illustrated in FIG. 2, the radio base stations eNB#0, eNB#1, HeNB#2, and HeNB#3 (hereinafter, representatively referred to as a radio base station eNB/HeNB) include a reception unit 11, a determination unit 12, and a transmission unit 13, respectively.

The reception unit 11 is configured to receive Measurement Report transmitted by a mobile station UE, and receive Handover Preparation Failure transmitted by the mobile switching center MME.

The determination unit 12 is configured to determine whether a handover destination candidate radio base station is a macro cell radio base station eNB or a small cell radio base station HeNB with reference to a predetermined bit set in Cell ID included in E-CGI included in the Measurement Report received from the mobile station UE.

Figure 3:
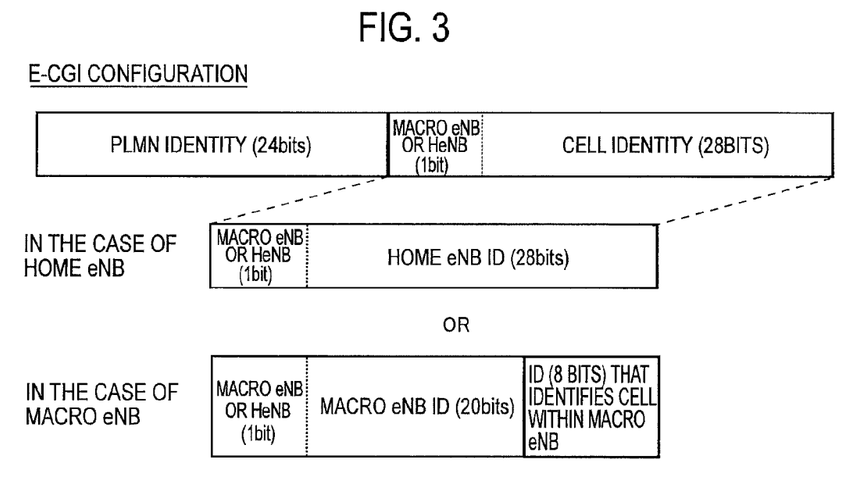
FIG. 3 is a diagram explaining the function of a determination unit of the radio base station eNB/HeNB according to the first embodiment of the present invention.

Specifically, as illustrated in FIG. 3, the E-CGI included in the Measurement Report includes PLMN Identity of 24 bit length and Cell Identity (Cell ID) of 28 bit length.

In the example of FIG. 3, the above-mentioned predetermined bit is the left most 1 bit in the Cell Identity. In addition, the above-mentioned predetermined bit may be 1 bit other than the left most 1 bit in the Cell Identity, or a plurality of bits in the Cell Identity.

For example, when "0" is set to the predetermined bit, identification information (Home) eNB ID of 28 bit length of the small cell radio base station HeNB is set in the Cell Identity.

Meanwhile, when "1" is set to the predetermined bit, identification information (Macro) eNB ID of 20 bit length of the macro cell radio base station eNB and an ID of 8 bit length for identifying a cell subordinate to the macro cell radio base station eNB have been set in the Cell Identity.

In addition, the predetermined bit constitutes a part of the identification information of 28 bit length of the small cell radio base station HeNB and the identification information of 20 bit length of the macro cell radio base station eNB.

The transmission unit 13 is configured to transmit Handover Required, in which the identification information eNB ID of the handover destination candidate radio base station is set, to the mobile switching center MME.

Here, when the determination unit 12 has determined that the handover destination candidate radio base station is the macro cell radio base station eNB, the transmission unit 13 is configured to transmit Handover Required, in which a part (20 bits) of Cell Identity/Cell ID is set as the identification information eNB ID of the handover destination candidate radio base station, to the mobile switching center MME.

Meanwhile, when the determination unit 12 has determined that the handover destination candidate radio base station is the small cell radio base station HeNB, the transmission unit 13 is configured to transmit Handover Required, in which the Cell Identity/Cell ID is set, as is, as the identification information eNB ID of the handover destination candidate radio base station, to the mobile switching center MME.

Figure 4:
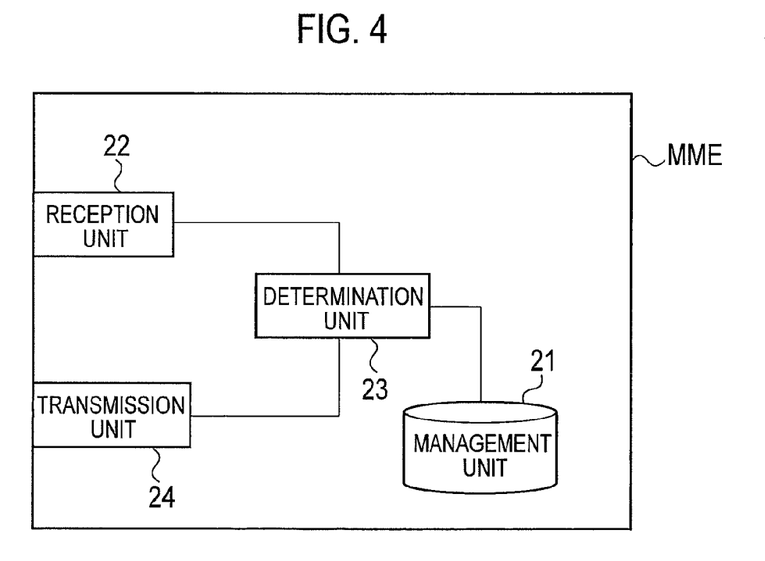
FIG. 4 is a functional block diagram of a mobile switching center MME according to the first embodiment of the present invention.

As illustrated in FIG. 4, the mobile switching center MME includes a management unit 21, a reception unit 22, a determination unit 23, and a transmission unit 24.

The management unit 21 is configured to manage an entry including the identification information eNB ID (Global eNB ID) of the radio base station eNB/HeNB subordinate to the mobile switching center MME, identification information TAI of a tracking area, or identification information CSG ID of a registration group.

The reception unit 22 is configured to receive HO Required related to a mobile station UE from a handover source radio base station S-eNB/S-HeNB.

The determination unit 23 is configured to determine whether an entry including the identification information eNB ID of the handover destination candidate radio base station included in the Handover Required received in the reception unit 22 is managed by the management unit 21.

Furthermore, the determination unit 23 is configured to determine whether the length of the identification information eNB ID of the handover destination candidate radio base station is 28 bits (a predetermined length) or 20 bits.

Moreover, the determination unit 23 is configured to determine whether an entry including the identification information TAI of the tracking area included in the Handover Required received in the reception unit 22 is managed by the management unit 21.

The transmission unit 24 is configured to transmit HO Request to a handover destination candidate radio base station eNB/HeNB, and to transmit Handover Preparation Failure to a handover source radio base station eNB/HeNB.

For example, even when it is determined that the entry including the identification information eNB ID of the handover destination candidate radio base station included in the Handover Required received in the reception unit 22 has not been managed by the management unit 21, if it is determined that the length of the identification information eNB ID of the handover destination candidate radio base station is the 28 bits (the predetermined length) and it is determined that the entry including the identification information TAI of the tracking area included in the Handover Required received in the reception unit 22 is managed by the management unit 21, the transmission unit 24 is configured to transmit Handover Request including the identification information TAI of the tracking area to the gateway device HeNB-GW.

Furthermore, when it is determined that the entry including the identification information eNB ID of the handover destination candidate radio base station included in the Handover Required received in the reception unit 22 has not been managed by the management unit 21 and the length of the identification information eNB ID of the handover destination candidate radio base station is not the 28 bits (the predetermined length) but 20 bits, the transmission unit 24 is configured to transmit the Handover Preparation Failure to the handover source radio base station eNB#0.

Operation of the Mobile Communication System According to the First Embodiment of the Present Invention The operation of the mobile communication system according to the first embodiment of the present invention will be described with reference to FIG. 5 to FIG. 7. Specifically, in the mobile communication system according to the first embodiment of the present invention, the S1 handover process of the mobile station UE from the handover source radio base station eNB#0 to the handover destination candidate radio base station eNB#1/HeNB#2/HeNB#3 will be described with reference to FIG. 5 to FIG. 7.

Figure 5:
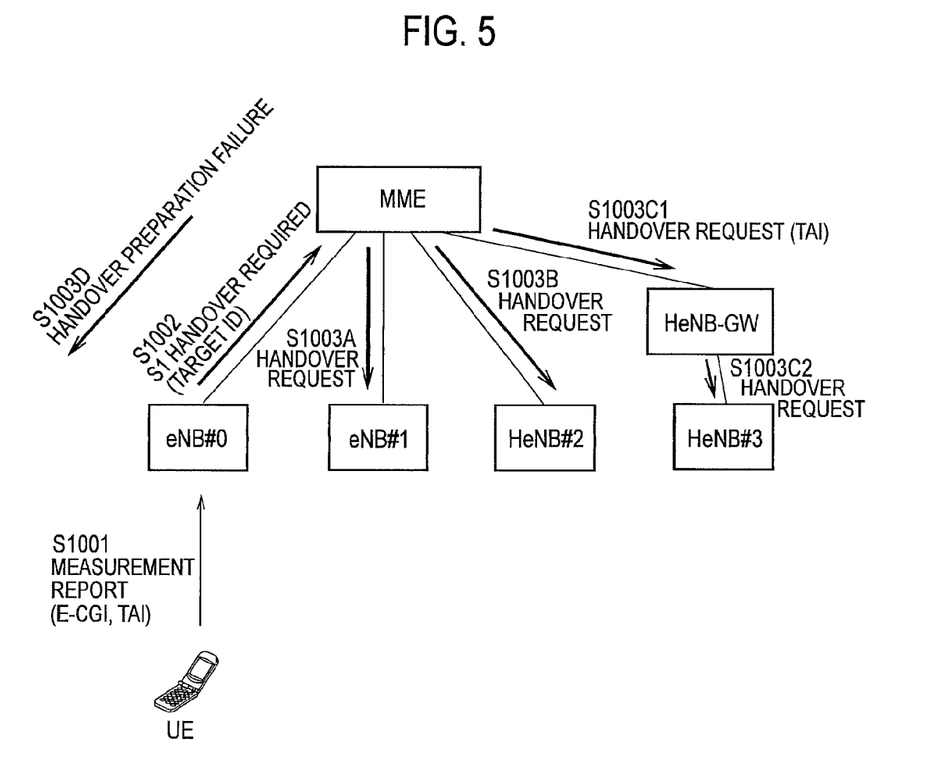
FIG. 5 is a diagram explaining the operation of the mobile communication system according to the first embodiment of the present invention.

As illustrated in FIG. 5, in step S1001, the mobile station UE transmits the Measurement Report to the radio base station eNB#0, wherein the Measurement Report includes the E-CGI related to the cell subordinate to the handover destination candidate radio base station eNB#1/HeNB#2/HeNB#3 and the identification information TAI of the tracking area.

Hereinafter, with reference to FIG. 6, the operation of the handover source radio base station eNB#0 when the Measurement Report is received will be described.

Figure 6:
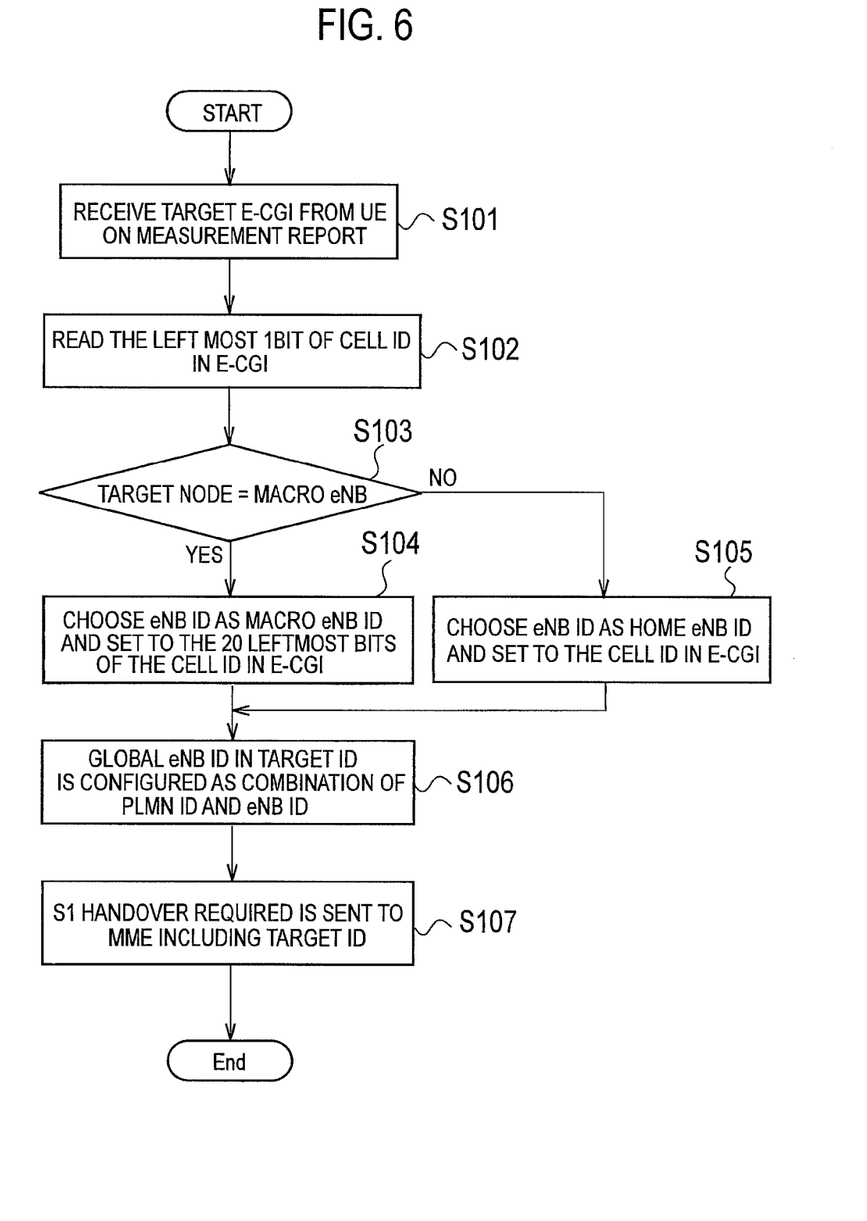
FIG. 6 is a flowchart explaining the operation of the radio base station eNB/HeNB according to the first embodiment of the present invention.

As illustrated in FIG. 6, the handover source radio base station eNB#0 extracts the E-CGI related to the cell subordinate to the handover destination candidate radio base station eNB#1/HeNB#2/HeNB#3 from the received Measurement Report in step S101, and reads the left most 1 bit of Cell Identity/Cell ID in the extracted E-CGI in step S102.

In step S103, the handover source radio base station eNB#0 determines whether the handover destination candidate radio base station is the macro cell radio base station eNB or the small cell radio base station HeNB based on the left most 1 bit (a predetermined bit).

When it is determined that the handover destination candidate radio base station is the macro cell radio base station eNB, the handover source radio base station eNB#0 sets the identification information (Macro) eNB ID of the macro cell radio base station eNB in the 20 left most bits of the Cell ID (28 bits) in the E-CGI as the identification information eNB ID of the handover destination candidate radio base station in step S104.

Meanwhile, when it is determined that the handover destination candidate radio base station is the small cell radio base station HeNB, the handover source radio base station eNB#0 sets the identification information (Home) eNB ID of the small cell radio base station HeNB in the Cell ID (28 bits) in the E-CGI as the identification information eNB ID of the handover destination candidate radio base station in step S105.

In step S106, the handover source radio base station eNB#0 configures Global eNB ID by combining the PLMN ID with the eNB ID of the handover destination candidate radio base station.

In step S107 (that is, in step S1002 illustrated in FIG. 5), the handover source radio base station eNB#0 sends Handover Required to the mobile switching center MME, wherein the Handover Required includes Target ID including the Global eNB ID and the above-mentioned TAI.

Hereinafter, with reference to FIG. 7, the operation of the mobile switching center MME having received the Handover Required will be described.

Figure 7:
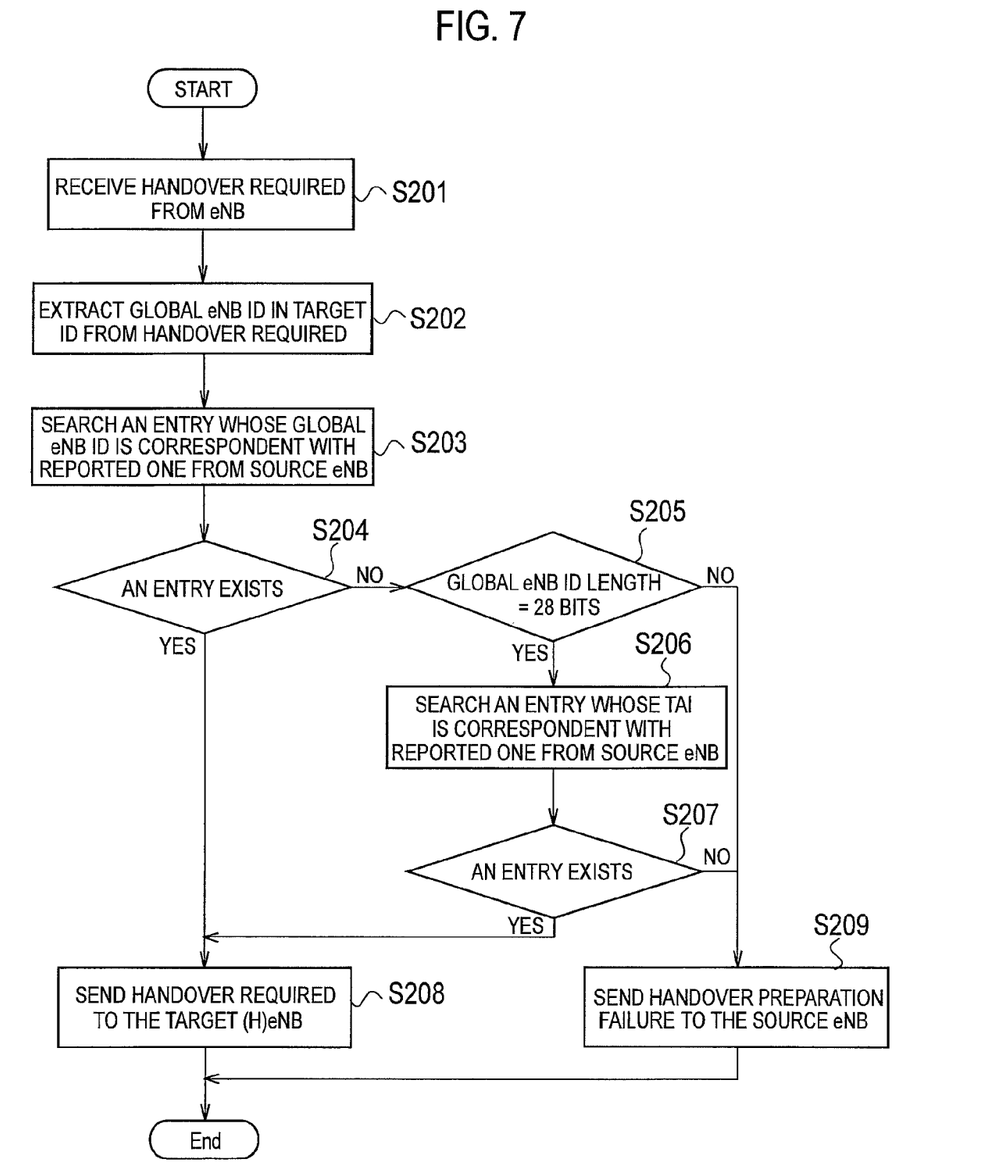
FIG. 7 is a flowchart explaining the operation of the mobile switching center MME according to the first embodiment of the present invention.

As illustrated in FIG. 7, the mobile switching center MME receives the Handover Required from the handover source radio base station eNB#0 in step S201 (that is, in step S1002 illustrated in FIG. 5), and extracts the Global eNB ID from the Target ID included in the Handover Required in step S202.

The mobile switching center MME searches for the management unit 21 in step S203, and determines whether an entry including the extracted Global eNB ID is managed in step S204.

The mobile switching center MME performs the process of step S205 when it is determined that the entry including the Global eNB ID has not been managed by the management unit 21, and performs the process of step S208 when it is determined that the entry including the Global eNB ID is managed by the management unit 21.

The mobile switching center MME determines whether the length of the Global eNB ID is 28 bits in step S205.

When it is determined that the length of the Global eNB ID is the 28 bits, the mobile switching center MME performs the process of step S206. When it is determined that the length of the Global eNB ID is not the 28 bits, that is, when it is determined that the length of the Global eNB ID is 20 bits, the mobile switching center MME performs the process of step S209.

The mobile switching center MME searches for the management unit 21 in step S206, and determines whether an entry including TAI included in the extracted Global eNB ID is managed in step S207.

The mobile switching center MME performs the process of step S209 when it is determined that the entry including the TAI has not been managed by the management unit 21, and performs the process of step S208 when it is determined that the entry including the TAI is managed by the management unit 21.

In step S208, the mobile switching center MME sends Handover Request to the handover destination candidate radio base station eNB#1/HeNB#2 (or the gateway device HeNB-GW).

Specifically, as with step S1003A of FIG. 5, the mobile switching center MME may transmit the Handover Request to the handover destination candidate radio base station eNB#1.

Furthermore, as with step S1003B of FIG. 5, the mobile switching center MME may transmit the Handover Request to the handover destination candidate radio base station HeNB#2.

Alternatively, as with step S1003C1 of FIG. 5, the mobile switching center MME may transmit the Handover Request including the TAI to the gateway device HeNB-GW.

In such a case, as with step S1003C2 of FIG. 5, the gateway device HeNB-GW transmits the Handover Request to the handover destination candidate radio base station HeNB#3.

Meanwhile, in step S209 illustrated in FIG. 7, the mobile switching center MME sends Handover Preparation Failure to the handover source radio base station eNB#0.

Operation and Effect of the Mobile Communication System According to the First Embodiment of the Present Invention In an existing LTE mobile communication system, when an handover is performed, since it is not possible for a handover source radio base station to determine the type (eNB/HeNB) of a handover destination candidate radio base station based on E-CGI included in Measurement Report transmitted by a mobile station UE, there is a problem that it is not possible to decide the length (20 bits or 28 bits) of an information element "Global eNB ID" in an information element "Target ID" in HO Required.

On the other hand, in accordance with the mobile communication system according to the first embodiment of the present invention, since it is possible for a handover source radio base station to determine whether a handover destination candidate radio base station is a macro cell radio base station eNB or a small cell radio base station HeNB using a predetermined bit in Cell Identity/Cell ID in E-CGI included in a received Measurement Report, even when radio base stations including radio base station identification information eNB IDs having different lengths are coexistent, it is possible to perform an S1 handover.

The characteristics of the present embodiment as described above may be expressed as follows.

A first characteristic of the present embodiment is summarized in that a mobile communication method, which performs a handover process of a mobile station UE from a cell subordinate to a handover source radio base station eNB#0 (a first radio base station) to a cell subordinate to a handover destination candidate radio base station eNB#1/HeNB#2/HeNB#3 (a second radio base station), includes: a step of determining, by the handover source radio base station eNB#0, whether the handover destination candidate radio base station is a macro cell radio base station eNB or a small cell (for example, a CSG cell) radio base station HeNB with reference to a predetermined bit (predetermined information) set in Cell ID (cell identification information capable of designating the cell subordinate to the second radio base station) included in E-CGI included in Measurement Report (measurement report) received from the mobile station UE; a step of transmitting, by the handover source radio base station eNB#0, Handover Required (a first handover request signal), in which a part (for example, the 20 left most bits of the Cell ID) of the Cell ID (28 bits) is set as identification information eNB ID of the handover destination candidate radio base station, to a mobile switching center MME when it is determined that the handover destination candidate radio base station is the macro cell radio base station eNB; and a step of transmitting, by the handover source radio base station eNB#0, Handover Required, in which the Cell ID (28 bits) is set, as is, as the identification information eNB ID of the handover destination candidate radio base station, to the mobile switching center MME when it is determined that the handover destination candidate radio base station is the small cell radio base station HeNB.

In the first characteristic of the present embodiment, the mobile switching center MME includes a management unit 21 configured to manage an entry including identification information eNB ID of a radio base station and identification information TAI of a tracking area, and the mobile communication method may include: a step of transmitting, by the mobile switching center MME, Handover Request (a second handover request signal) including the identification information TAI of the tracking area to a gateway device HeNB-GW if the length of the identification information eNB ID of the handover destination candidate radio base station is 28 bits (a predetermined length) and an entry including the identification information TAI of the tracking area included in Handover Required is managed by the management unit 21 even when an entry including the identification information eNB ID of the handover destination candidate radio base station included in the Handover Required has not been managed by the management unit 21; and a step of transmitting, by the gateway device HeNB-GW, Handover Request (a third handover request signal) to the handover destination candidate radio base station HeNB#3 designated by the identification information TAI of the tracking area included in the received Handover Request and the identification information eNB ID of the handover destination candidate radio base station, which corresponds to E-CGI.

In the first characteristic of the present embodiment, the mobile switching center MME includes a management unit 21 configured to manage an entry including identification information eNB ID of a radio base station and identification information TAI of a tracking area, and the mobile communication method may include: a step of transmitting, by the mobile switching center MME, Handover Preparation Failure (a handover failure signal) to the handover source radio base station eNB#0 when an entry including the identification information eNB ID of the handover destination candidate radio base station included in the Handover Required has not been managed by the management unit 21 and the length of the identification information eNB ID of the handover destination candidate radio base station is not 28 bits (a predetermined length) but 20 bits.

A second characteristic of the present embodiment is summarized in that a radio base station eNB/HeNB, which serves as a handover source radio base station in a handover process of a mobile station UE from a cell subordinate to the handover source radio base station to a cell subordinate to a handover destination candidate radio base station, includes: a determination unit 12 configured to determine whether the handover destination candidate radio base station is a macro cell radio base station eNB or a small cell radio base station HeNB with reference to a predetermined bit set in Cell ID included in E-CGI included in Measurement Report received from the mobile station UE; and a transmission unit 13 configured to transmit Handover Required (a handover request signal), in which identification information eNB ID of the handover destination candidate radio base station is set, to a mobile switching center MME, wherein, when the determination unit 12 has determined that the handover destination candidate radio base station is the macro cell radio base station eNB, the transmission unit 13 is configured to transmit Handover Required, in which a part of the Cell ID is set as the identification information eNB ID of the handover destination candidate radio base station, to the mobile switching center MME, and when the determination unit 12 has determined that the handover destination candidate radio base station is the small cell radio base station HeNB, the transmission unit 13 is configured to transmit Handover Required, in which the Cell ID is set, as is, as the identification information eNB ID of the handover destination candidate radio base station, to the mobile switching center MME.

In addition, the operation of the above-mentioned the mobile station UE, the radio base station eNB/HeNB, the gateway device HeNB-GW or the mobile switching center MME may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the mobile station UE, the radio base station eNB/HeNB, the gateway device HeNB-GW or the mobile switching center MME. As a discrete component, such storage medium and processor may be arranged in the mobile station UE, the radio base station eNB/HeNB, the gateway device HeNB-GW or the mobile switching center MME.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method and a radio base station, by which it is possible to perform an S1 handover even when radio base stations including radio base station identification information eNB IDs having different lengths are coexistent.

The invention claimed is:

1. A mobile communication method, which performs a handover process of a mobile station from a cell subordinate to a first radio base station to a cell subordinate to a second radio base station, comprising:
   a step of determining, by the first radio base station, whether the second radio base station is a macro cell radio base station or a small cell radio base station with reference to predetermined information set in cell identification information capable of designating the cell subordinate to the second radio base station, which is included in a measurement report received from the mobile station;
   a step of transmitting, by the first radio base station, a first handover request signal, in which a part of the cell identification information is set as identification information of the second radio base station, to a mobile switching center when it is determined that the second radio base station is the macro cell radio base station; and
   a step of transmitting, by the first radio base station, a first handover request signal, in which the cell identification information is set, as is, as the identification information of the second radio base station, to the mobile switching center when it is determined that the second radio base station is the small cell radio base station, wherein
   the mobile switching center comprises a management unit configured to manage an entry including identification information of a radio base station and identification information of a tracking area, and
   the mobile communication method further comprises:
   a step of transmitting, by the mobile switching center, a second handover request signal including the identification information of the tracking area to a gateway device accommodated the second radio base station if a length of the identification information of the second radio base station is a predetermined length and an entry including the identification information of the tracking area included in the first handover request signal is managed by the management unit even when an entry including the identification information of the second radio base station included in the first handover request signal has not been managed by the management unit; and
   a step of transmitting, by the gateway device, a third handover request signal to the second radio base station designated by the tracking area included in the received second handover request signal and the identification information of the second radio base station, which corresponds to the identification information of the radio base station.

2. The mobile communication method according to claim 1, wherein the mobile communication method comprises:
   a step of transmitting, by the mobile switching center, a handover failure signal to the first radio base station when an entry including the identification information of the second radio base station included in the first handover request signal has not been managed by the management unit and a length of the identification information of the second radio base station is not a predetermined length.

3. A mobile switching center used in a mobile communication system which performs a handover process of a mobile station from a cell subordinate to a first radio base station to a cell subordinate to a second radio base station, comprising:
   a management unit configured to manage an entry including identification information of a tracking area and identification information of a radio base station; and
   a transmission unit configured to transmit a second handover request signal including the identification information of the tracking area to a gateway device accommodated the second radio base station if a length of the identification information of the second radio base station is a predetermined length, and an entry including the identification information of the tracking area included in a first handover request signal is managed by the management unit even when an entry including the identification information of the second radio base station included in the first handover request signal received from the first radio base station has not been managed by the management unit, wherein the first radio base station is configured to determine whether the second radio base station is a macro cell radio base station or a small cell radio base station with reference to predetermined information set in cell identification information capable of designating the cell subordinate to the second radio base station, and wherein the gateway device receives the second handover request signal and transmits a third handover request signal to the second radio base station designated by the tracking area included in the received second handover request signal and the identification information of the second radio base station.

* * * * *